US009876996B2

(12) United States Patent
Campbell et al.

(10) Patent No.: US 9,876,996 B2
(45) Date of Patent: Jan. 23, 2018

(54) FOCAL COMPENSATION FOR THERMAL EXPANSION OF CAMERA OPTICS USING CHROMATIC ABERRATION

(71) Applicant: GoPro, Inc., San Mateo, CA (US)

(72) Inventors: Scott Patrick Campbell, Belmont, CA (US); Gary Fong, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/348,972

(22) Filed: Nov. 10, 2016

(65) Prior Publication Data
US 2017/0195545 A1 Jul. 6, 2017

Related U.S. Application Data

(60) Provisional application No. 62/273,157, filed on Dec. 30, 2015.

(51) Int. Cl.
*H04N 9/04* (2006.01)
*H04N 9/73* (2006.01)
*H04N 5/367* (2011.01)

(52) U.S. Cl.
CPC ............... *H04N 9/045* (2013.01); *H04N 9/73* (2013.01); *H04N 5/367* (2013.01)

(58) Field of Classification Search
CPC .......... H04N 9/045; H04N 9/73; H04N 9/825; H04N 9/86; H04N 3/26
See application file for complete search history.

(56) References Cited

U.S. PATENT DOCUMENTS

| | | | |
|---|---|---|---|
| 9,541,838 B2 * | 1/2017 | Ershov ................ G03F 7/70033 |
| 9,692,349 B2 * | 6/2017 | Lee ........................ H02P 29/024 |
| 2005/0071705 A1 * | 3/2005 | Bruno ..................... G06F 1/206 713/500 |
| 2005/0163524 A1 * | 7/2005 | Shiobara ............ G03G 15/2039 399/69 |
| 2008/0036883 A1 * | 2/2008 | Hara ....................... H04N 5/367 348/246 |
| 2009/0027558 A1 * | 1/2009 | Mantiuk ............... H04N 1/6027 348/673 |
| 2011/0019184 A1 * | 1/2011 | Iwane ..................... G02B 7/36 356/123 |

* cited by examiner

*Primary Examiner* — Hung Lam
(74) *Attorney, Agent, or Firm* — Fenwick & West LLP

(57) ABSTRACT

An image processor adjusts luminance values of pixels in a captured image to compensate for effects on focal quality due to thermal expansion or contraction. Responsivity values for different colors are characterized and a table is generated mapping temperature values to weights for each pixel color based on the relationship between temperature and focal length and the relationship between focal length and focal quality in each different color. Luminance values for one color may be compensated based on the measured luminance values for other colors, the relative responsivity values, and the weights.

20 Claims, 5 Drawing Sheets

FOCAL COMPENSATION FOR THERMAL EXPANSION OF CAMERA OPTICS USING CHROMATIC ABERRATION

CROSS REFERENCE TO RELATED APPLICATION

This application claims the benefit of U.S. Provisional Application No. 62/273,157, filed Dec. 30, 2015, the content of which is incorporated by reference in its entirety.

TECHNICAL FIELD

This disclosure relates to image processing, and more specifically, to a post processing thermal compensation mechanism for adjusting focus.

BACKGROUND

In a conventional camera system, materials used for the camera lens mount, lens barrel, or other components may expand or contract due to changes in temperature of the camera lens assembly resulting in a change in focal length of the camera representing the distance between the lens and the image sensor. Additionally, the lens optical elements inside the lens barrel can increase or decrease the focal length of the lens due to changes in temperature. The expansion or contraction of any of the camera components may cause the positions of the lenses to shift along the optical axis, thus altering the focal distance. This affects the focus of the lenses and compromises performance.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
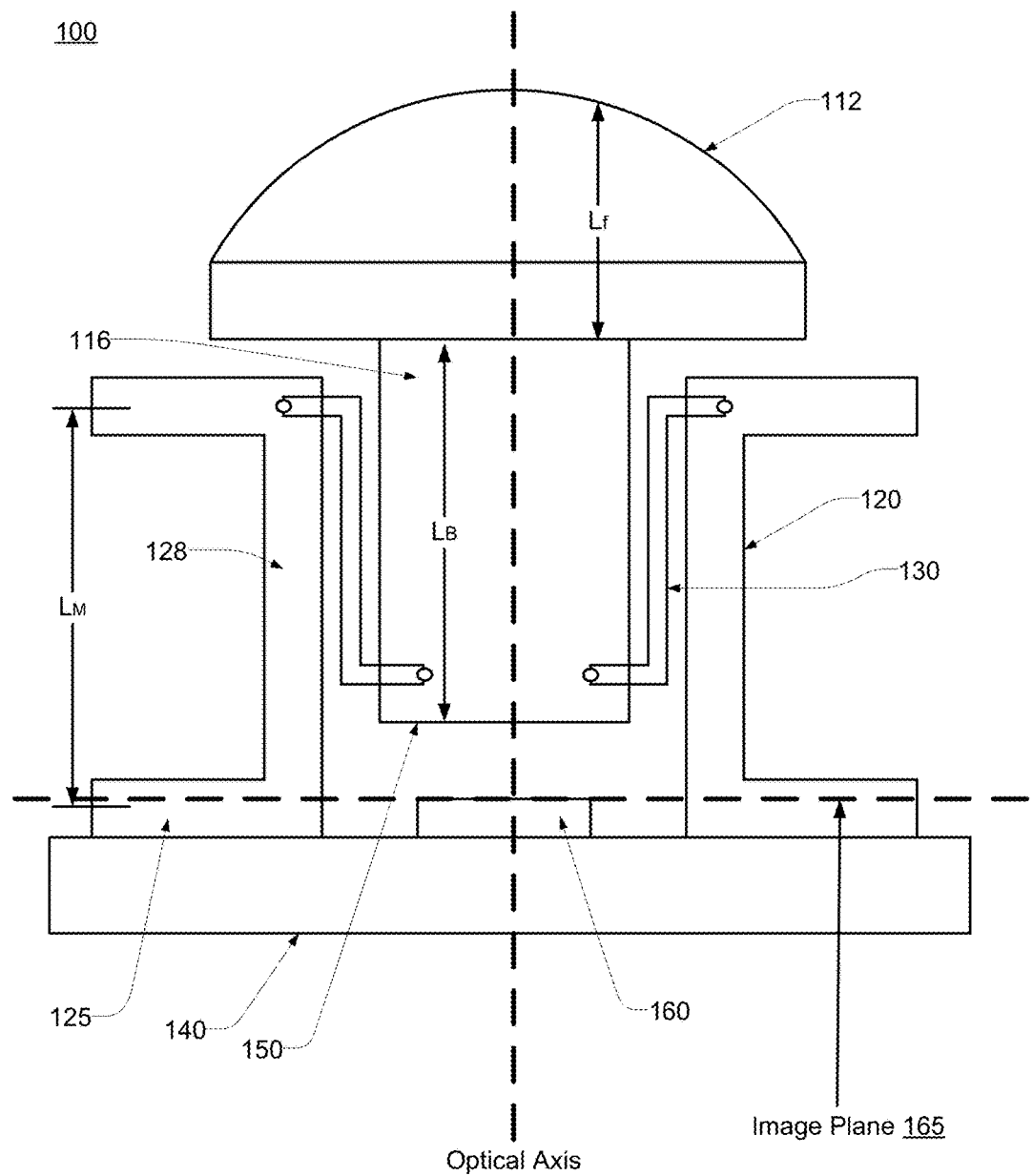
FIG. 1 illustrates an integrated image sensor and camera lens system, according to one embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera system compensates for thermal effects on focus based on chromatic aberration. In a first embodiment, a method characterizes a fixed-focal length camera for thermal-based compensation in a camera having an image sensor to sense light of a first color, a second color, and a third color. A lens assembly of the camera is calibrated to have a baseline focal plane distance with respect to an image sensor when operating at a baseline temperature. For each pixel of the image sensor, a first responsivity value for the first color, a second responsivity for the second color, and a third responsivity, the responsivity values representing respective color values are generated by the image sensor in response to white light when operating at a baseline temperature. A focal plane distance transfer function of the camera is determined representing a change in focal plane distance of the camera from the baseline focal plane distance with respect to a change in temperature from the baseline temperature. A set of focal quality functions representing respective changes in focal quality of the first color, the second color, and the third color with respect to the change in focal plane distance is also characterized. A look up table is generated based on the focal plane distance transfer function and the set of focal quality functions. The lookup table indicates for a plurality of different temperatures, a first weight for the first color value, a second weight for the second color value, and a third weight for the third color value, the first, second, and third weights varying with the focal quality of a respective color when operating at respective temperatures. The lookup table and the sensor responsivities are stored to a storage medium.

In another embodiment, a method provides temperature-based focal compensation in a camera having an image sensor comprising a plurality of pixels to sense light of a first color, a second color, and a third color. For a given pixel a first responsivity value for the first color, a second responsivity value for the second color, and a third responsivity value for the third color are received that represent respective luminance values generated by the image sensor in response to white light when operating at a baseline temperature. A sensed temperature is also received. A first luminance value for the first color, a second luminance value for a second color, and a third luminance value for the third color are received for the pixel. Based on the sensed temperature, a first weight for the first luminance value, a second weight for the second luminance value, and a third weight for the third luminance value are determined. The first, second, and third weights vary with focal qualities of each respective color when operating at the sensed temperature. The second luminance value is normalized based on a ratio of the first responsivity value to the second responsivity value to generate a normalized second color value. The third luminance value is also normalized based on a ratio of the first responsivity value to the third responsivity value to generate a normalized third luminance value. A processor generates a compensated first luminance value as a combination of the first luminance value weighted by the first weight, the normalized second luminance value weighted by the second weight, and the normalized third luminance value weighted by the third weight.

Example Integrated Image Sensor and Lens Assembly

Turning now to FIG. 1, it illustrates an embodiment of an integrated image sensor and lens assembly 100 that may include a camera lens barrel 150, a camera lens mount 120, a collet 130 and an image sensor substrate 140. The image sensor substrate 140 may have an image sensor 160 (e.g., a high-definition image sensor) for capturing images and/or video. For accurate focus, the image sensor 160 lies on an image plane 165. The camera lens mount 120 may physically couple with the image sensor substrate 140 and may couple to the camera lens barrel 150 via the collet 130.

In one embodiment, the image sensor 160 may be a sensor that detects and conveys information that constitutes an image to the image processor. The image sensor 160 may comprise a color filter array that passes red, green or blue light to selected pixel sensors. The pixel sensors output a value (e.g., in the form of a voltage or current) representing luminance of the light detected for each of the respective colors. These values may be used to create an image. The camera lens 112 may focus the light reflected or emitted from objects to the light-sensitive surface of the camera (e.g. the image sensor 160). The distance from the image sensor 160 to the camera lens 112 may be termed as the focal length and may be characterized relative to a baseline value (e.g. an optimal focus value) and a baseline temperature (e.g. room temperature) at the time of manufacture.

The different portions of the camera lens assembly 100 can be made of different types of material (e.g. brass, aluminum, plastic, etc.). Each material may have a different coefficient of thermal expansion defining how the material expands or contracts with change in temperature.

The camera lens mount 120 may comprise a base portion 125 and a tube portion 128. The base portion 125 may include a bottom surface in a plane substantially parallel to a surface of the image sensor substrate 140. The tube portion 128 of the lens mount 120 may extend away from the image sensor assembly along the optical axis and may include a substantially cylindrical channel for receiving the lens barrel 150.

The lens barrel 150 may comprise one or more lenses or other optical components to direct light to the image sensor 160. The lower portion of the lens barrel 116 may be substantially cylindrical and structured to at least partially extend into the channel of the tube portion 128 of the camera lens mount 120. The lens optical assembly 112 may include optical components (e.g. one or more lenses) to enable external light to enter the lens barrel 150 and be directed to the image sensor assembly 130. The optical components of the lens optical assembly 112 may be positioned along the optical axis at various distances from the image plane and may include elements external to the barrel 150 or internal elements (not shown in the figure).

The collet may physically couple the lens barrel 150 to the camera lens mount 120. The collet may be made of, for example, brass, aluminum, plastic, or other material. In alternative embodiments, the integrated sensor and lens assembly 100 may instead comprises two-part configuration (e.g., including a lens mount 120 that couples directly to the lens barrel 150 without the collet 130) or a one-part configuration in which the lens mount 120 and lens barrel 150 include a single integrated structure.

Regardless of the configuration of the integrated sensor and lens assembly 100, the integrated sensor and lens assembly 100 may experience a change in temperature due to, for example, external weather or heating from use of the camera. A change in temperature causes the materials of the lens barrel 150, camera lens mount 120 and the collet 130 to expand or contract. Expansion or contraction of these components shifts the position of the lens or lenses relative to the image sensor 160 which can cause defocus of the image. Furthermore, temperature change in the lens optical assembly 112 causes expansion or contraction of its materials as well as a change in distances between the lens elements, which can further affect the overall focal length. The change in the focal length changes causes degradation of the image or video quality.

Spot Size Vs Focal Distance

Figure 2:
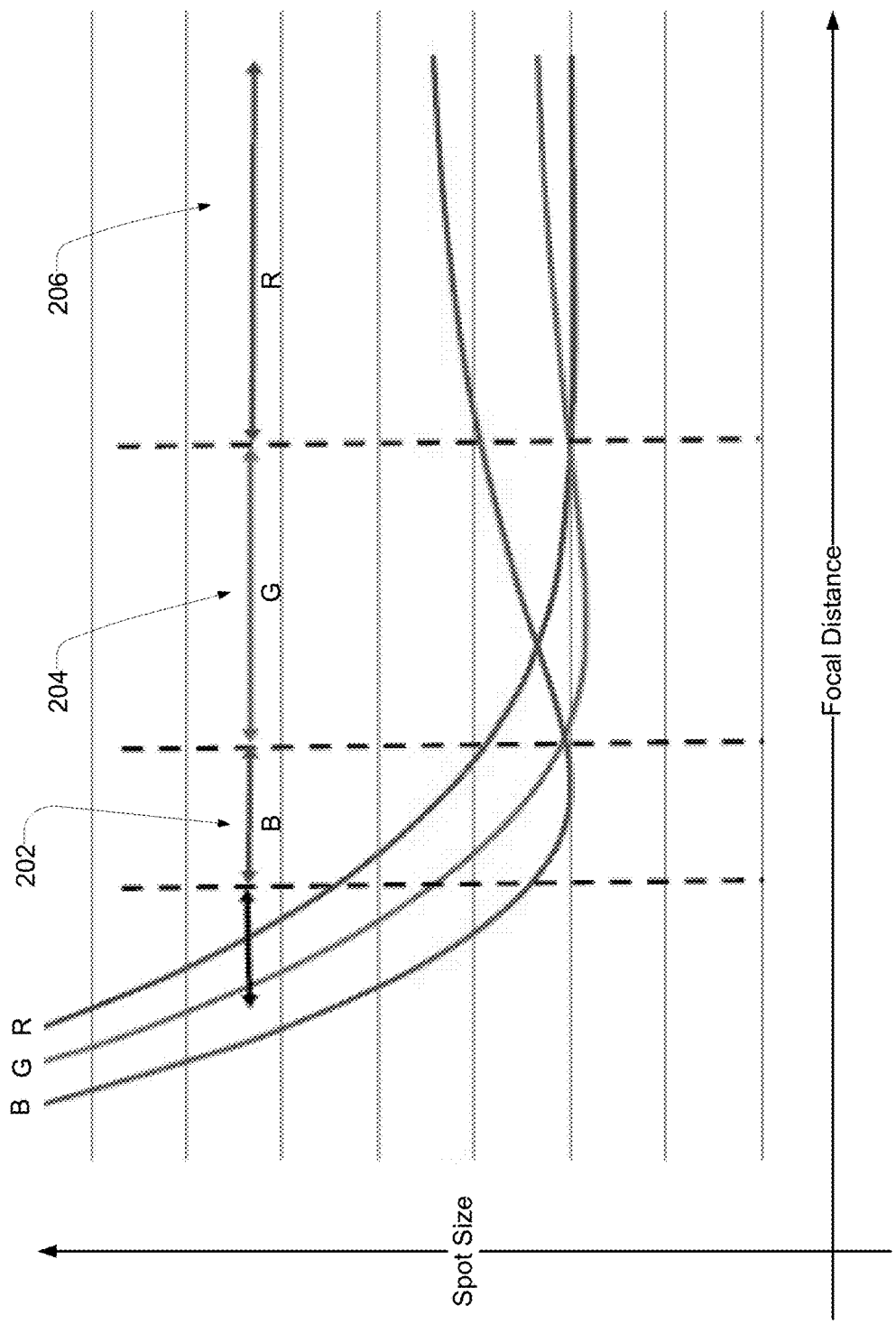
FIG. 2 illustrates the relation of a spot size of a color to the focal distance of a camera lens, according to one embodiment.

The change in focal length may affect the perceived focus of different colors differently. The perceived focus at different focal lengths can be characterized by a spot size measure, which represents the relative sizes of spots of different colors as captured by the image sensor 160. As focus degrades, the sensed light bleeds into adjacent pixels and an increase in spot size is perceived. As focus improves, the spot size decreases. FIG. 2 illustrates the relationship of a spot size of a color to the focal distance of a camera lens, according to one embodiment. Each color has a focal distance at which the optimal focus occurs which is indicated by the minimum spot size. At different focal distances, different colors may provide the best focus (smallest spot size) relative to the other colors. For example, in region 202, blue light is most in focus relative to the other colors; in region 204, green light is most in focus relative to the other colors; and in region 206, red light is most in focus relative to the other colors. In an embodiment, the camera is calibrated to have a focal distance in region 204 at the baseline temperature. Thus, at the baseline temperature, green light has the best focus relative to the other colors. Alternatively, the camera may be calibrated to have a focal distance in a different region (e.g., region 202 or 206 at the baseline temperature.

In one embodiment, to account for second order effects, a different spot size vs. focal distance curve may exist for different temperatures. These curves may be characterized during manufacture of the camera.

Characterization for Thermal Compensation

As temperature changes, the focal distance may change as described above, thereby causing a change in focus which may be different for each color. By understanding which color provides the best focus at any given focal distance, the luminance data for the best color for a given target pixel may be used to scale luminance data for the other colors in adjacent pixels. This technique operates on the principle that the color data associated with the target pixel location for the more poorly focused colors will bleed into the adjacent pixels due to the increased spot size. This defocus effect may be compensated based on a known difference in spot sizes between colors at a given focal length.

Figure 3:
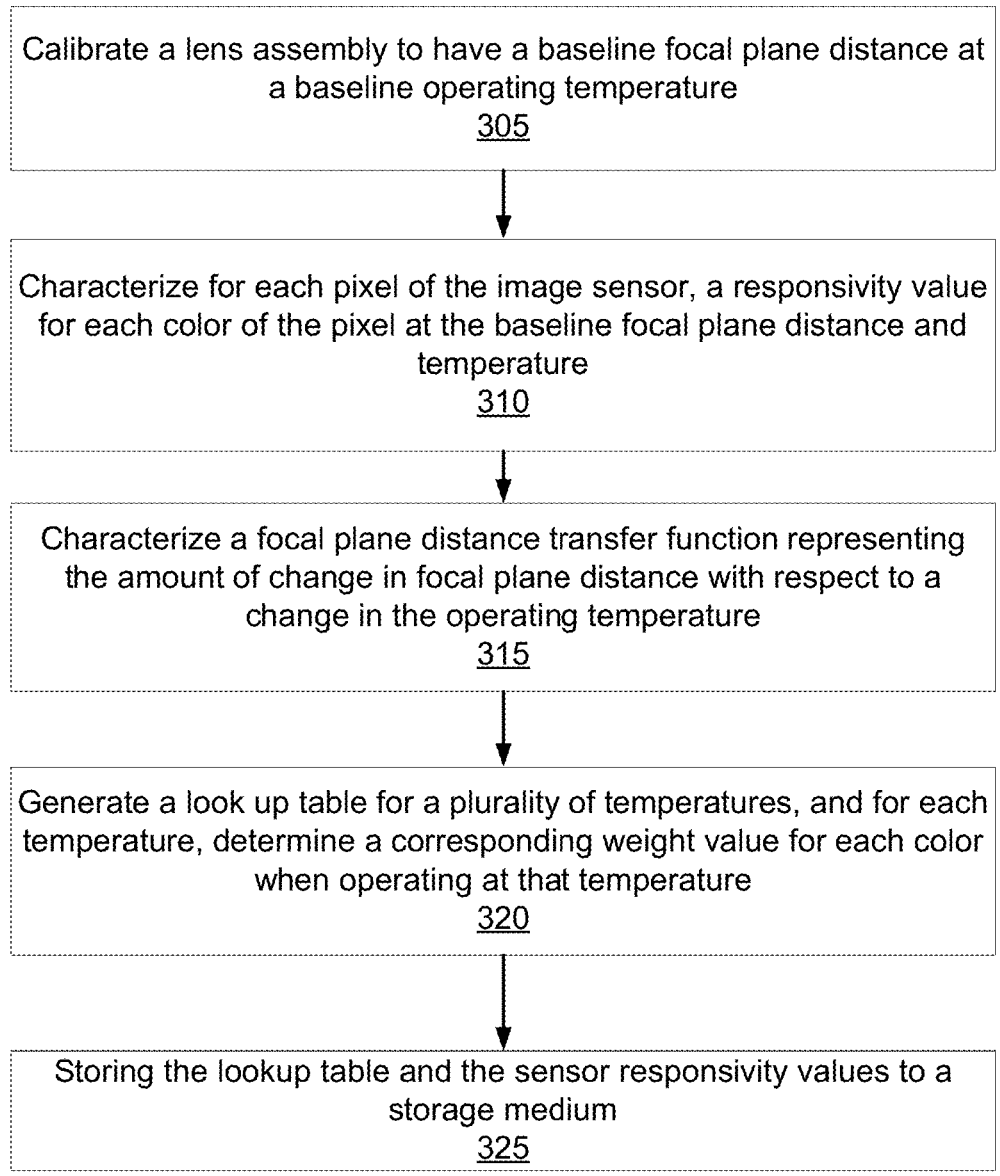
FIG. 3 is a flowchart illustrating a method for characterizing a fixed-focal length camera for thermal based compensation, according to one embodiment.

FIG. 3 is a flowchart illustrating a method for characterizing a fixed-focal length camera to generate characterization data that can be used to compensate for thermal effects on focus, according to one embodiment. In one embodiment, the focal distance of the camera lens assembly 100 is initially calibrated 305 to have a baseline focal plane distance at a baseline operating temperature. For example, in one embodiment, this calibration may involve optimizing focus for green light at room temperature, although different baseline parameters may be used in alternative embodiments. At the baseline operating temperature, i.e. room temperature, a responsivity of each color of a pixel of the image sensor may be characterized 310. Here, responsivity refers to the amount of luminance detected for each color in response to a white light incident on the image sensor of the camera lens assembly. For example, in an embodiment, a responsivity value between 0 and 255 may be determined for each color. For example, for a pixel (i,j), when white light is directed on the image sensor, lrc(i,j) is the amount of luminance detected for the red color, lgc(i,j) is the amount of luminance detected for the green color and lbc(i,j) is the amount of luminance detected for the blue color.

At the time of manufacture, a focal plane distance transfer function for the camera lens assembly is also characterized 315. The focal plane distance transfer function may provide the change in the focal plane distance $D_f(t)$ from the characterized baseline focal plane distance in accordance with a change in temperature from the baseline temperature (for example, room temperature). $D_f(t)$ may be a function of the lens and materials in the lens barrel and the lens mount and other materials of the lens assembly that may expand with an increase in temperature or contract with a decrease in temperature. In an embodiment, the focal plane distance transfer function may be represented by a lookup table. Here, the lookup table may be characterized empirically by observing the change in the focal length at different temperatures and recording the respective changes in focal length.

Additionally, a set of functions representing a focal quality measure (e.g., spot size) at different focal distances may be characterized for each color, such as in FIG. 2. In one embodiment, to compensate for second order effects, different sets of functions for each color mapping focal quality to focal distance may be determined at different temperatures. For example, the curves in FIG. 2 may have different shapes at different temperatures.

A look up table is generated 320 that indicates, for each of a plurality of temperatures, weights associated with each color for weighting respective luminance values detected when operating at the particular temperature. The weights may be determined based on the transfer function $D_f(t)$ described above indicating how focal distance changes with temperature, and the set of functions relating focal quality (e.g., spot size) to different focal distances. In one embodiment, a weight is assigned for a color at a given temperature that is inversely related to the relative spot size for that color at the given temperature (and corresponding focal distance). For example, in the range where blue light is best focused relative to the other colors (e.g., region 202 of FIG. 2), blue light may be weighted more heavily than the other colors (inversely proportional to the relative spot size of the colors); in the image where green light is best focused relative to the other colors (e.g., region 204 of FIG. 2), green light may be most heavily weighted, and in the range where red light is best focused (e.g., region 206 of FIG. 2), red light may be weighted most heavily.

For example, it is assumed that $D_f(T)$, i.e. the focal plane distance drops as the temperature drops. In one embodiment, if the camera is originally calibrated for green light at room temperature, the camera will operate in the green region 204 of the illustrated spot size vs focal distance graph described above. As the temperature drops, the focal distance decreases to the blue region 202 in which blue light is at the best focus at the reduced temperature relative to the other colors. In that case, for the reduced temperature, the weight associated with the blue pixel is increased and the weights associated with the red and green pixels are decreased. Similarly, if the temperature increases from the baseline temperature, the camera may operate in the red region 206 in which red light is at the best focus for the increased temperature. In that case, for the increased temperature, the weight associated with the red pixel is increased and the weight associated with the blue and green pixels are decreased.

In another embodiment, the weights could be limited to 0 or 1, so that in the green region 204, only the green luminance value is considered, and in the blue region 202 only the blue luminance value and in the red region 206, only the red luminance value is considered. In either embodiment, it is assumed that the weight is inversely proportional to the relative difference in the spot size at any given temperature or focal distance, i.e. bigger spot size indicates worse focus resulting in a less weight for that color.

In an embodiment, the sum of the weights is equal to 1.

The lookup table mapping the change in temperature to the weights and the characterized responsivity values are stored 325 in a storage medium for further use in thermal compensation when post processing an image or a video.

In one embodiment, the process of FIG. 3 may be performed by an automated calibration device having a processor and a non-transitory computer-readable storage medium, that stores instructions that when executed by the processor carry out the steps of the process of FIG. 3 described above.

Thermal Compensation

Figure 4:
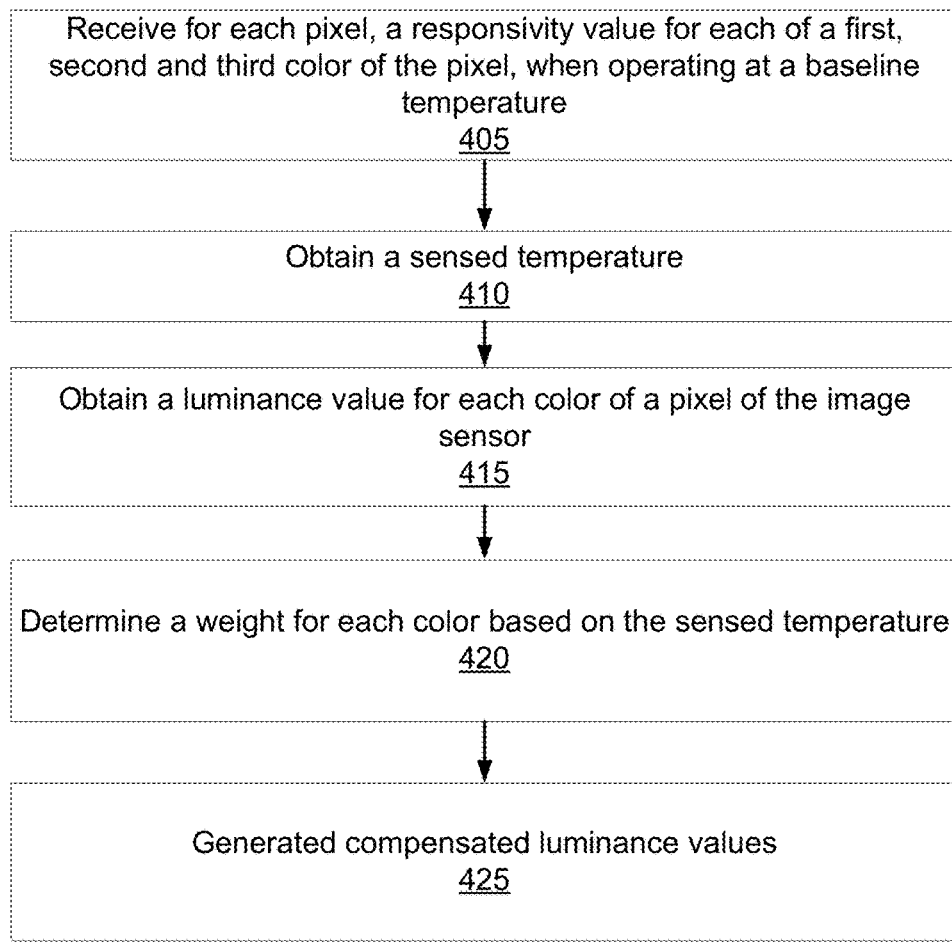
FIG. 4 is a flowchart illustrating a method for temperature based focal compensation in a fixed-focal length camera system, according to one embodiment.

FIG. 4 is a flowchart illustrating a method for temperature based focal compensation in a fixed-focal length camera system, according to one embodiment. A camera system may capture an image (e.g., a picture or video frame). The image sensor of the camera system comprises an array of pixels that each capture luminance values corresponding to different colors of light such as red, blue and green representing the captured image. The camera furthermore comprises a temperature sensor to sense a temperature of the camera at the time the image is captured. A transformation is applied to each of the luminance values for the different colors of each pixel to adjust the luminance values based on the sensed temperature. For example, compensated luminance values for red, green, and blue pixels may be computed as follows:

$$lr'(i, j) = wr(T)*lr(i, j) + wg(T)*lg(i, j)*\frac{lrc(i, j)}{lgc(i, j)} + wb(T)*lb(i, j)*\frac{lrc(i, j)}{lbc(i, j)} \quad (1)$$

$$lg'(i, j) = wg(T)*lg(i, j) + wr(T)*lr(i, j)*\frac{lgc(i, j)}{lrc(i, j)} + wb(T)*lb(i, j)*\frac{lgc(i, j)}{lbc(i, j)} \quad (2)$$

$$lb'(i, j) = wb(T)*lb(i, j) + wr(T)*lr(i, j)*\frac{lbc(i, j)}{lrc(i, j)} + wg(T)*lg(i, j)*\frac{lbc(i, j)}{lgc(i, j)} \quad (3)$$

where lr(i, j), lg (i, j), and lb(i, j) represent the sensed red, green, and blue luminance values for a pixel i, j, wr(T), wg(T), and wb(T) represent the weights for red, green, and blue respectively at a given temperature T according to the lookup table described above, lrc(i, j), lgc(i, j), lbc(i, j) represent the characterized responsivity values for red, green, and blue respectively, and lr'(i, j), lg'(i, j), and lb'(i, j) represent the compensated red, green, and blue luminance values for a pixel i, j respectively.

In an embodiment, a process for compensating luminance values of a pixel i, j includes receiving 405 a responsivity value for each color of the pixel, e.g. lrc(i,j), lgc(i,j), lbc(i,j). Further, a current temperature T of the camera lens system is obtained 410 representing a temperature sensed at the time of capture. A luminance value of the each color of the pixel of the image sensor is obtained 415 from the captured image, e.g. lr(i,j) for a red pixel, lg(i,j) for a green pixel and lb(i,j) for a blue pixel.

Based on the sensed temperature, a weight for each color is determined 420, e.g. wr(T), wg(T), wb(T). In one embodiment, the weights are predefined for each temperature and stored as a look up table as described above.

A compensated luminance value for each color is then generated 425. For example, in one embodiment, generating a compensated luminance value for a first color (e.g., red) comprises determining a weighted combination of the luminance value for the first color and normalized and weighted luminance values for a second color (e.g., green) and a third color (e.g., blue). The normalized luminance values for the second color may be generated based on a ratio of the characterized responsivity value of the first color (e.g., red) to the second color (e.g., green). Similarly, the normalized luminance values for the third color (e.g., blue) may be generated based on a ratio of the characterized responsivity value of the third color (e.g., blue) to the first color (e.g., red). Compensated luminance values for each color may be similarly determined using the equations above.

In one embodiment, the process of FIG. 4 may be performed by an automated calibration device having a processor and a non-transitory computer-readable storage medium, that stores instructions that when executed by the processor carry out the steps of the process of FIG. 4 described above.

Example Camera Configuration

Figure 5:
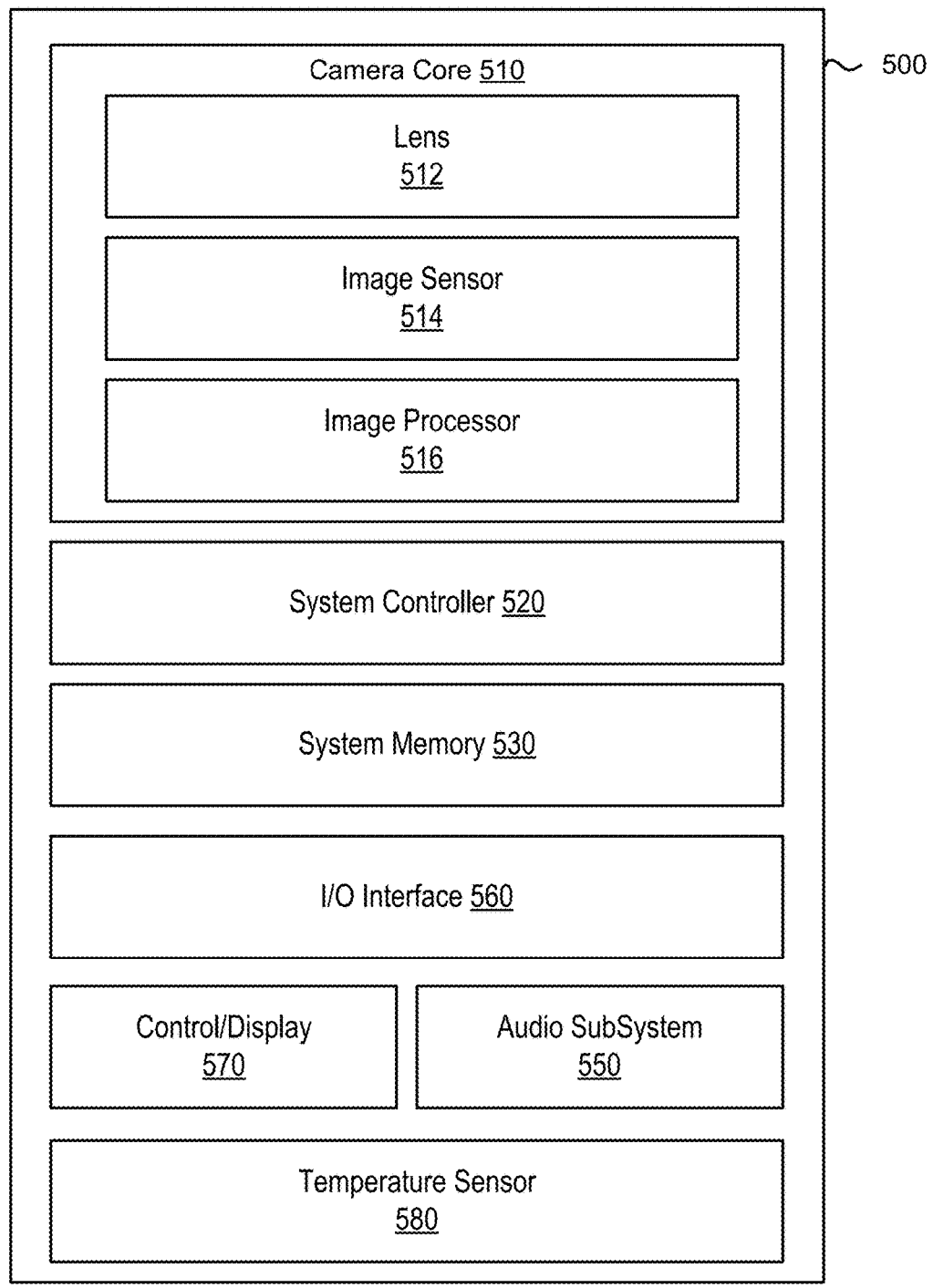
FIG. 5 illustrates an example machine for use with a system for temperature based focal compensation, according to one embodiment.

FIG. 5 is a block diagram illustrating a camera 500, according to one embodiment. In the illustrated embodiment, the camera 500 comprises a camera core 510 comprising a lens assembly 512, an image sensor 514, and an image processor 516. The camera 500 additionally includes a system controller 520 (e.g., a microcontroller or microprocessor) that controls the operation and functionality of the camera 500 and system memory 530 configured to store executable computer instructions that, when executed by the system controller 520 and/or the image processors 516, perform the camera functionalities described herein. In some embodiments, a camera 500 may include multiple camera cores 510 to capture fields of view in different directions which can then be stitched together to form a cohesive image. Furthermore, the camera 500 may include a temperature sensor 580 that may record a sensed temperature at the time of capturing an image.

The lens 512 can be, for example, a wide angle lens, hemispherical, or hyper-hemispherical lens that focuses light entering the lens to the image sensor 514 which captures images and/or video frames. The image sensor 514 may capture high-definition images having a resolution of, for example, 720p, 1080p, 4 k, or higher. For video, the image sensor 514 may capture video at frame rates of, for example, 30 frames per second, 60 frames per second, or higher. The image processor 516 performs one or more image processing functions of the captured images or video such as the functions of FIG. 4 described above. For example, the processes described herein may be performed by the image processor 516 (or other processor) loading instructions stored to a non-transitory computer-readable storage medium. When executed by the processor, the instructions cause the processor to carry out the functions attributed to the process described herein.

Additionally, the image processor 516 may perform functions such as a Bayer transformation, demosaicing, noise reduction, image sharpening, image stabilization, rolling shutter artifact reduction, color space conversion, compression, or other in-camera processing functions. Processed images and video may be temporarily or persistently stored to system memory 530 and/or to a non-volatile storage, which may be in the form of internal storage or an external memory card. The system memory 530 or other memory may furthermore store data such as, for example, the lookup table with the weights described above, the responsivity data, or other characterizing data used in the embodiments described herein.

An input/output (I/O) interface 560 transmits and receives data from various external devices. For example, the I/O interface 560 may facilitate the receiving or transmitting video or audio information through an I/O port. Examples of I/O ports or interfaces include USB ports, HDMI ports, Ethernet ports, audio ports, and the like. Furthermore, embodiments of the I/O interface 560 may include wireless ports that can accommodate wireless connections to the peripheral device or other devices. Examples of wireless ports include Bluetooth, Wireless USB, Near Field Communication (NFC), and the like. The I/O interface 160 may also include an interface to synchronize the camera 500 with other cameras or with other external devices, such as a smart phone, a client device, or a video server.

A control/display subsystem 570 includes various control and display components associated with operation of the camera 500 including, for example, LED lights, a display, buttons, microphones, speakers, and the like. The audio subsystem 550 includes, for example, one or more microphones and one or more audio processors to capture and process audio data correlated with video capture. In one embodiment, the audio subsystem 550 includes a microphone array having two or microphones arranged to obtain directional audio signals.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. A method for temperature-based focal compensation in a camera having an image sensor comprising a plurality of pixels to sense light of a first color, a second color, and a third color, the method comprising:
   receiving for a pixel, a first responsivity value for the first color, a second responsivity value for the second color, and a third responsivity value for the third color, the responsivity values representing respective luminance values generated by the image sensor in response to white light when operating at a baseline temperature;
   receiving a sensed temperature;
   capturing for the pixel of the image sensor, a first luminance value for the first color, a second luminance value for a second color, and a third luminance value for the third color;
   determining, based on the sensed temperature, a first weight for the first luminance value, a second weight for the second luminance value, and a third weight for the third luminance value, the first, second, and third weights varying with focal qualities of each respective color when operating at the sensed temperature;
   normalizing the second luminance value based on a ratio of the first responsivity value to the second responsivity value to generate a normalized second color value;
   normalizing the third luminance value based on a ratio of the first responsivity value to the third responsivity value to generate a normalized third luminance value;
   generating, by a processor, a compensated first luminance value as a combination of the first luminance value weighted by the first weight, the normalized second luminance value weighted by the second weight, and the normalized third luminance value weighted by the third weight.

2. The method of claim 1 wherein a highest weight of the first weight, the second weight, and the third weight is applied to one of the first luminance value, the normalized second luminance value, and the normalized third luminance value that is associated with a best focused color of the first color, the second color, and the third color at the sensed temperature.

3. The method of claim 1, wherein the sum of the first weight, the second weight and the third weight is equal to 1.

4. The method of claim 1, wherein determining the first weight, the second weight, and the third weight comprises:
   performing a lookup in a look up table using the sensed temperature to determine the first, second, and third weights.

5. The method of claim 4, wherein the look up table includes predetermined weights for a plurality of temperatures, the predetermined weights derived from a relationship between spot size and focal distance to an image sensor.

6. The method of claim 5, wherein the relationship between the spot size and the focal distance is different for different temperatures of the plurality of temperatures.

7. A computer-implemented method for characterizing a fixed-focal length camera for thermal-based compensation, the camera having an image sensor to sense light of a first color, a second color, and a third color, the method comprising:
   calibrating a lens assembly of the camera to have a baseline focal plane distance with respect to an image sensor when operating at a baseline temperature;
   characterizing for each pixel of the image sensor, a first responsivity value for the first color, a second responsivity for the second color, and a third responsivity, the responsivity values representing respective color values generated by the image sensor in response to white light when operating at a baseline temperature;
   characterizing a focal plane distance transfer function of the camera representing a change in focal plane distance of the camera from the baseline focal plane distance with respect to a change in temperature from the baseline temperature;
   characterizing a set of focal quality functions representing respective changes in focal quality of the first color, the second color, and the third color with respect to the change in focal plane distance;
   generating based on the focal plane distance transfer function and the set of focal quality functions, a lookup table indicating for a plurality of different temperatures, a first weight for the first color value, a second weight for the second color value, and a third weight for the third color value, the first, second, and third weights varying with the focal quality of a respective color when operating at respective temperatures; and
   storing the lookup table and the sensor responsivities to a storage medium.

8. The method of claim 7, wherein determining the first weight, the second weight, and the third weight comprises:
   determining a best focused color of the first, second, and third color for a change in focal plane distance when operating the image sensor at a given temperature;
   determining a baseline weight associated with the best focused color; and
   determining secondary weights associated with remaining colors that do not correspond to the best focused color, the secondary weights lower than the baseline weight.

9. The method of claim 7, wherein the sum of the first weight, the second weight and the third weight is equal to 1.

10. The method of claim 7, wherein the focal quality is based on a spot size measure.

11. A non-transitory computer-readable storage medium storing instructions for temperature-based focal compensation in a camera having an image sensor comprising a plurality of pixels to sense light of a first color, a second color, and a third color, the instructions when executed by a processor causing the processor to perform steps comprising:
   receiving for a pixel, a first responsivity value for the first color, a second responsivity value for the second color, and a third responsivity value for the third color, the responsivity values representing respective luminance values generated by the image sensor in response to white light when operating at a baseline temperature;
   receiving a sensed temperature;
   capturing for the pixel of the image sensor, a first luminance value for the first color, a second luminance value for a second color, and a third luminance value for the third color;
   determining, based on the sensed temperature, a first weight for the first luminance value, a second weight for the second luminance value, and a third weight for the third luminance value, the first, second, and third weights varying with focal qualities of each respective color when operating at the sensed temperature;

normalizing the second luminance value based on a ratio of the first responsivity value to the second responsivity value to generate a normalized second color value;

normalizing the third luminance value based on a ratio of the first responsivity value to the third responsivity value to generate a normalized third luminance value;

generating a compensated first luminance value as a combination of the first luminance value weighted by the first weight, the normalized second luminance value weighted by the second weight, and the normalized third luminance value weighted by the third weight.

12. The non-transitory computer-readable storage medium of claim 11 wherein a highest weight of the first weight, the second weight, and the third weight is applied to one of the first luminance value, the normalized second luminance value, and the normalized third luminance value that is associated with a best focused color of the first color, the second color, and the third color at the sensed temperature.

13. The non-transitory computer-readable storage medium of claim 11, wherein the sum of the first weight, the second weight and the third weight is equal to 1.

14. The non-transitory computer-readable storage medium of claim 11, wherein determining the first weight, the second weight, and the third weight comprises:

performing a lookup in a look up table using the sensed temperature to determine the first, second, and third weights.

15. The non-transitory computer-readable storage medium of claim 14, wherein the look up table includes predetermined weights for a plurality of temperatures, the predetermined weights derived from a relationship between spot size and focal distance to an image sensor.

16. The non-transitory computer-readable storage medium of claim 15, wherein the relationship between the spot size and the focal distance is different for different temperatures of the plurality of temperatures.

17. A camera comprising:
a temperature sensor for sensing a temperature;
a processor;
a non-transitory computer-readable storage medium storing instructions for temperature-based focal compensation in a camera having an image sensor comprising a plurality of pixels to sense light of a first color, a second color, and a third color, the instructions when executed by the processor causing the processor to perform steps comprising:

receiving for a pixel, a first responsivity value for the first color, a second responsivity value for the second color, and a third responsivity value for the third color, the responsivity values representing respective luminance values generated by the image sensor in response to white light when operating at a baseline temperature;

receiving the sensed temperature;

capturing for the pixel of the image sensor, a first luminance value for the first color, a second luminance value for a second color, and a third luminance value for the third color;

determining, based on the sensed temperature, a first weight for the first luminance value, a second weight for the second luminance value, and a third weight for the third luminance value, the first, second, and third weights varying with focal qualities of each respective color when operating at the sensed temperature;

normalizing the second luminance value based on a ratio of the first responsivity value to the second responsivity value to generate a normalized second color value;

normalizing the third luminance value based on a ratio of the first responsivity value to the third responsivity value to generate a normalized third luminance value;

generating a compensated first luminance value as a combination of the first luminance value weighted by the first weight, the normalized second luminance value weighted by the second weight, and the normalized third luminance value weighted by the third weight.

18. The camera of claim 17, wherein a highest weight of the first weight, the second weight, and the third weight is applied to one of the first luminance value, the normalized second luminance value, and the normalized third luminance value that is associated with a best focused color of the first color, the second color, and the third color at the sensed temperature.

19. The camera of claim 17, wherein determining the first weight, the second weight, and the third weight comprises:

performing a lookup in a look up table using the sensed temperature to determine the first, second, and third weights.

20. The camera of claim 19, wherein the look up table includes predetermined weights for a plurality of temperatures, the predetermined weights derived from a relationship between spot size and focal distance to an image sensor.

* * * * *